(12) United States Patent
Messina et al.

(10) Patent No.: US 12,132,413 B2
(45) Date of Patent: Oct. 29, 2024

(54) CONTROL METHOD FOR POWER SUPPLY CONVERTERS, CORRESPONDING CONVERTER AND DEVICE

(71) Applicant: STMicroelectronics S.r.l., Agrate Brianza (IT)

(72) Inventors: Sebastiano Messina, Mascalucia (IT); Marco Torrisi, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 215 days.

(21) Appl. No.: 17/838,792

(22) Filed: Jun. 13, 2022

(65) Prior Publication Data

US 2022/0399829 A1 Dec. 15, 2022

(30) Foreign Application Priority Data

Jun. 15, 2021 (IT) .......................... 102021000015665

(51) Int. Cl.
*H02M 7/219* (2006.01)
(52) U.S. Cl.
CPC .................................... *H02M 7/219* (2013.01)
(58) Field of Classification Search
CPC ........ H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217;
(Continued)

(56) References Cited

U.S. PATENT DOCUMENTS 10,148,260 B2 * 12/2018 Tomasovics ......... H05B 45/375
2005/0206358 A1 * 9/2005 Van Der Horn ...... H02M 3/156
323/282
(Continued)

OTHER PUBLICATIONS

IT Search Report and Written Opinion for priority application, IT 102021000015665, report dated Feb. 16, 2022, 7 pgs.
(Continued)

*Primary Examiner* — Thienvu V Tran
*Assistant Examiner* — Nusrat Quddus
(74) *Attorney, Agent, or Firm* — Crowe & Dunlevy LLC

(57) ABSTRACT

A converter circuit converts an input signal applied across a first and a second input node into a converted output signal across a first and a second output node. The converter circuit includes a switching network coupled to the first input node via an inductor having a current flowing therethrough. In a hysteresis current control mode of the switching network, the current flowing through the inductor has a triangular waveform with rising and falling edges between a first current threshold and a second current threshold alternating with a switching frequency. The switching frequency is controlled by varying the distance between the first current threshold and the second current threshold.

29 Claims, 6 Drawing Sheets

(58) Field of Classification Search
CPC ............ H02M 7/21; H02M 7/12; H02M 7/04; H02M 7/00
See application file for complete search history.

(56) References Cited

U.S. PATENT DOCUMENTS

| | | | |
|---|---|---|---|
| 2014/0268922 A1* | 9/2014 | Balakrishnan | H02M 3/156 363/21.17 |
| 2017/0110981 A1* | 4/2017 | Deboy | H02M 3/1588 |
| 2018/0083540 A1* | 3/2018 | Pham | H02M 1/08 |
| 2018/0091051 A1* | 3/2018 | Langlinais | H02M 3/158 |
| 2019/0115835 A1* | 4/2019 | Cohen | H02M 3/1588 |
| 2021/0194378 A1* | 6/2021 | Tian | H02M 1/083 |
| 2021/0313875 A1* | 10/2021 | Messina | H02M 1/4208 |
| 2023/0114503 A1* | 4/2023 | Chen | H02M 1/0025 323/259 |

OTHER PUBLICATIONS

Sun Jingjing et al: Mitigation of Current Distortion for GaN-Based CRM Totem-Pole PFC Rectifier With ZVS Control, IEEE Open Journal of Power Electronics, IEEE, vol. 2, Apr. 6, 2021, pp. 290-303, XP011853007.

Huan Qingyun et al: Predictive ZVS Control With Improved ZVS Time Margin and Limited Variable Frequency Range for a 99% Efficient, 130W/in3 MHz GaN Totem-Pole PFC Rectifier2, IEEE Transactions On Power Electronics, Institute of Eletrical and Electronics Engineers, USA, vol. 34, No. 7, Oct. 2, 2018, pp. 7079-7091, XP011722111.

* cited by examiner

CONTROL METHOD FOR POWER SUPPLY CONVERTERS, CORRESPONDING CONVERTER AND DEVICE

PRIORITY CLAIM

This application claims the priority benefit of Italian Application for Patent No. 102021000015665, filed on Jun. 15, 2021, the content of which is hereby incorporated by reference in its entirety to the maximum extent allowable by law.

TECHNICAL FIELD

The description relates to power supply circuits.

One or more embodiments can be applied, for instance, to power factor correction (PFC) circuits based on a totem pole bridgeless topology.

One or more embodiments can operate with hysteresis current control.

One or more embodiments can be applied to a variety of devices such as telecom apparatus, air conditioners, television units and chargers.

BACKGROUND

Single-phase power factor correction (PFC) technology is steadily moving in the direction of high-efficiency solutions. Totem pole bridgeless PFC topology is representative of architecture extensively used to follow such a trend.

Various control techniques may be used to increase efficiency. A possible approach may involve achieving Zero Voltage Switching (ZVS) or Valley Switching (VS) operation, which is effective in countering undesired "on" switching losses.

In power converters operating with variable frequency, operating conditions may reach a point where the switching frequency is undesirably high. For instance, in PFC circuits this problem may occur near the zero crossing of the input voltage and/or in the presence of a light load. A high switching frequency of the converter may adversely affect operation of the control circuit and increase switching losses in the semiconductor devices included in the converter (and in the converter as a whole).

There is a need in the art to contribute in addressing the issues discussed in the foregoing.

SUMMARY

One or more embodiments relate to a method.

One or more embodiments relate to a corresponding converter circuit.

One or more embodiments may relate to a corresponding device comprising an electrical load supplied via a converter as disclosed herein. A variety of devices such as telecom apparatus, air conditioners, television units and chargers may be exemplary of such a device.

One or more embodiments may involve using hysteresis current control with a first (high) threshold and a second (low) threshold. The thresholds are controlled in a way that facilitates improved control of the converter switching frequency and contributes to improving the quality of electrical parameters of the converter such as total harmonic distortion (THD) and power factor correction (PFC) performance, for instance.

One or more embodiments may contemplate applying a controlled current over the entire voltage input range and period in order to limit the switching frequency of the converter while at the same time countering undesired current discontinuities.

One or more embodiments contemplate a driving mode of a power converter where an electronic switch energizes an inductor via a reverse current.

One or more embodiments may use a large-bandwidth isolated current sensor in order to perform direct control of the inductor current.

In one or more embodiments, the inductor energy associated with a current flowing therethrough can be used to charge/discharge the parasitic capacitances of electronic switches. This facilitates achieving a ZVS condition and reducing the switching frequency. Such a current is applied for all possible values of the input voltage in order to limit the switching frequency.

One or more embodiments provide a simple and powerful solution to limit the maximum switching frequency in a converter. This results in improved control feasibility and reduced current distortion, thus providing improved power quality.

One or more embodiments can be applied to all types of power converters with current/time fraction control.

In one or more embodiments, controlling the inductor current may involve controlling the associated (equivalent) reverse conduction time, provided the reverse current level is taken into account in order to compensate undesired current distortion.

BRIEF DESCRIPTION OF THE DRAWINGS

One or more embodiments will now be described, by way of example only, with reference to the annexed figures, wherein.

DETAILED DESCRIPTION

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

In the ensuing description various specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments. The headings/references used herein are provided merely for convenience and hence do not define the extent of protection or the scope of the embodiments.

Various acronyms are used for brevity throughout this description such as. Examples of such acronyms include: PFC=Power Factor Correction; ZVS=Zero Voltage Switching; and VS=Valley Switching.

Figure 9:
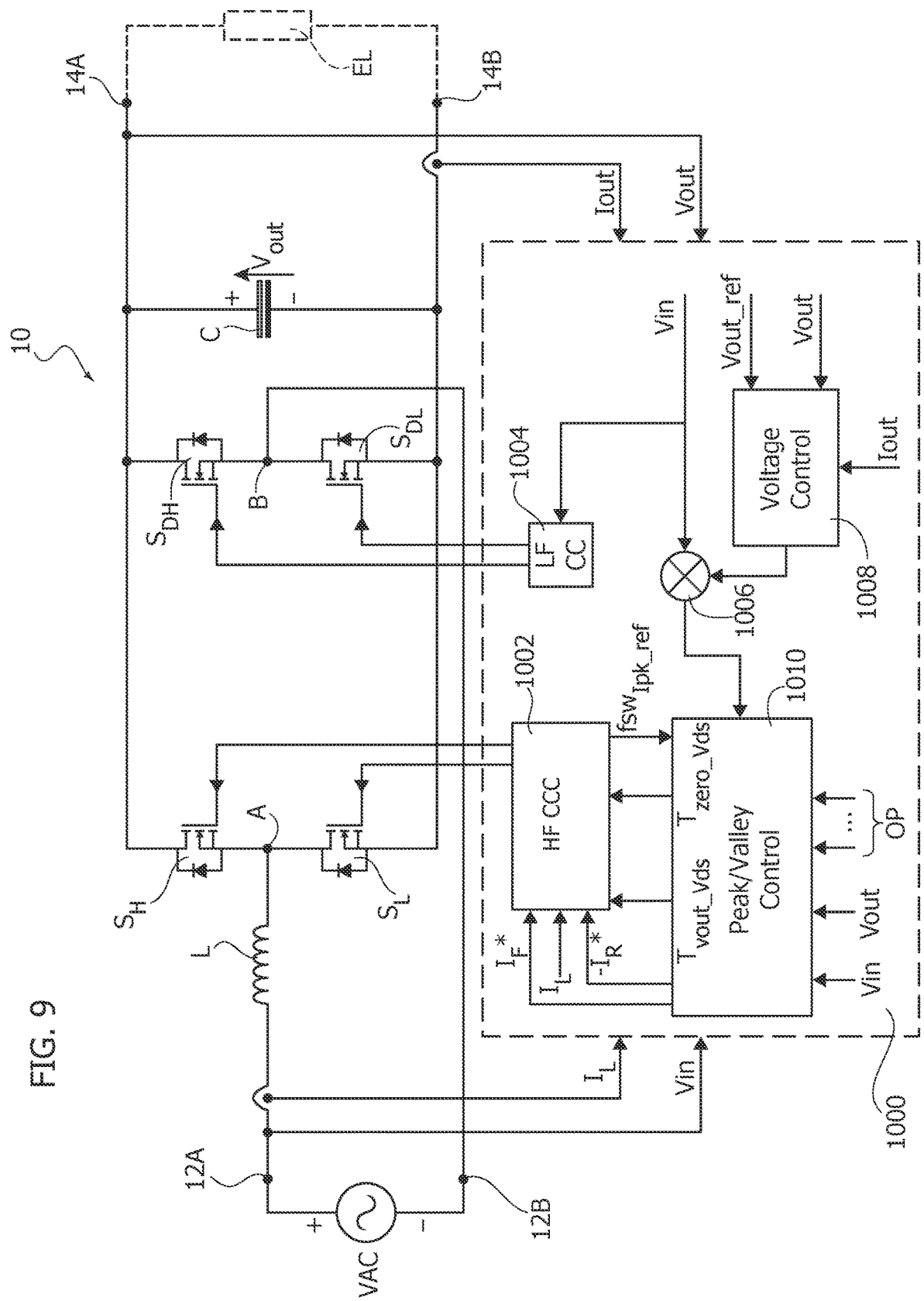
FIG. 9 is a block/circuit diagram representative of an exemplary layout of a converter circuit according to embodiments of the present description.

Also, throughout the present description, a same designation may be used for brevity to designate both certain node/line/component and a signal occurring at that node/line/component: for instance, in FIG. 9 a current sensor having an output line configured to provide a signal indicative of the intensity of the current flowing through an inductor indicated as L are both referred to as $I_L$ for brevity.

Figure 1:
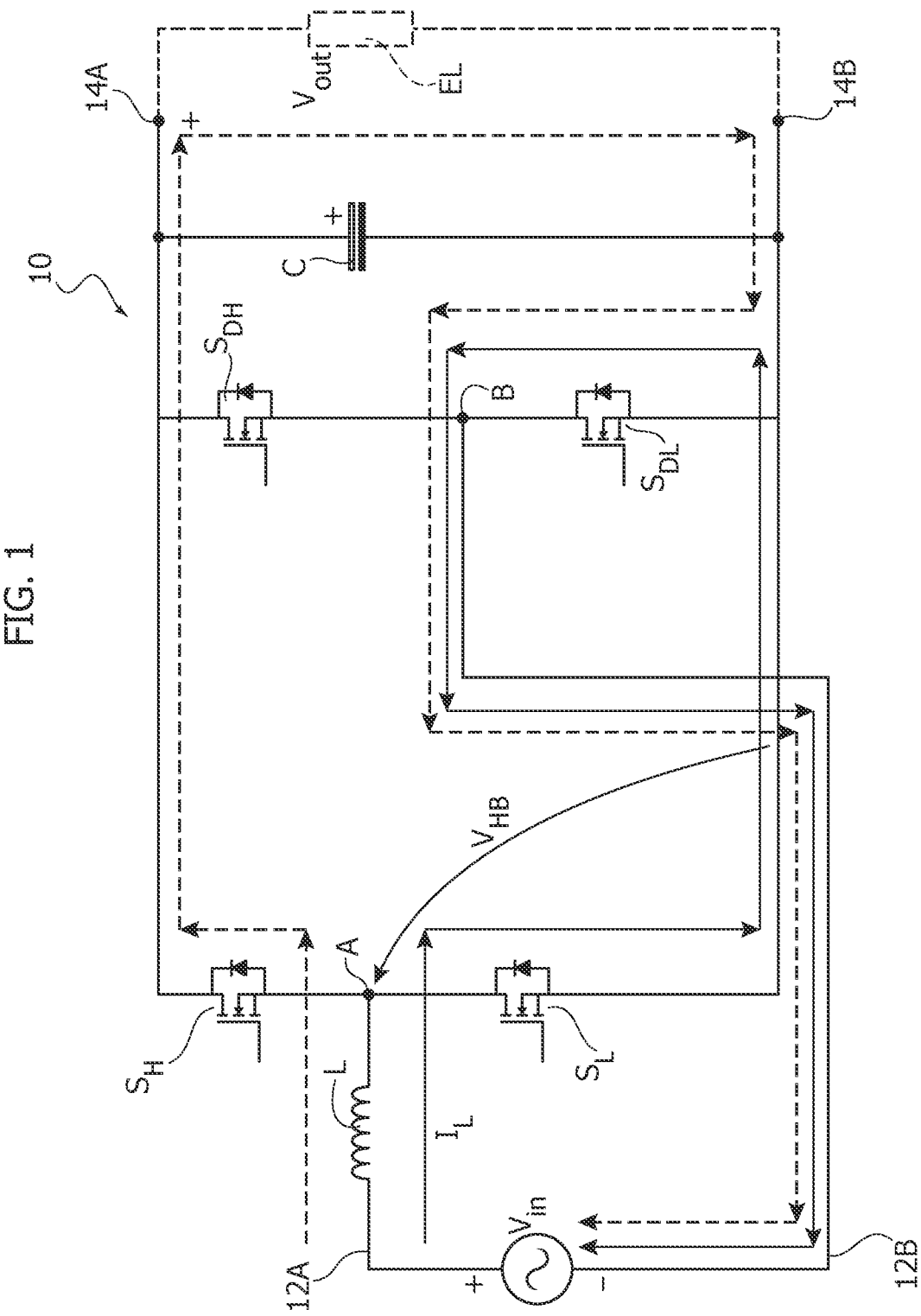
FIG. 1 is a circuit diagram exemplary of a converter circuit where embodiments of the present description can be applied.

The diagram of FIG. 1 is exemplary of a topology of a so-called "totem pole" bridgeless power factor correction circuit 10. The circuit 10 comprises input nodes 12A, 12B configured to have applied therebetween an AC input signal Vin with the purpose of generating between output nodes 14A and 14B a converted (rectified) voltage Vout to be applied to an electrical load EL.

Those of skill in the art will appreciate that the topology of the converter 10 illustrated herein is merely exemplary.

The operating principles underlying the examples as discussed herein are in fact applicable to different converter topologies such as buck, boost, buck-boost, flyback, Single-Ended Primary Inductor Converter (SEPIC), and so on.

These examples may apply mutatis mutandis to various conversion approaches (AC/DC, DC/AC, DC/DC and AC/AC, for instance), with no limitations.

This applies primarily, but not exclusively, to the switch configuration.

Also, those of skill in the art will appreciate that operation as exemplified herein (primarily in connection with a Zero Voltage Switching (ZVS) operation mode) are applicable also to other operation modes such as, e.g., Continuous Conduction Mode (CCM), Discontinuous Conduction Mode (DCM) or Transition Mode (TM), for instance.

Also, while illustrated for the sake of understanding, both the source of the input signal Vin and the load EL to which the converted output signal Vout is applied may represent distinct elements from the embodiments.

As exemplified in FIG. 1, the circuit 10 comprises two nodes A and B.

The node A lies intermediate a "high side" electronic switch $S_H$ and a "low side" electronic switch $S_L$ in a first pair of electronic switches such as MOSFET transistors.

The node B lies intermediate a "high side" electronic switch $S_{DH}$ and a "low-side" electronic switch $S_{DL}$ in a second pair of electronic switches $S_{DH}$, $S_{DL}$; again, MOSFET transistors may be exemplary of such switches).

It is noted the switches $S_H$, $S_L$, $S_{DH}$, $S_{LH}$ can be implemented with different types of switches (e.g., MOSFET transistors, as illustrated, or IGBT, SCR, and so on) and technologies (Si, SiC, GaN, for instance) and/or in any configuration, connection or combination (e.g., series connection, parallel connection, cascode, and so on).

As illustrated, an input inductor L is coupled intermediate the first input node 12A and the node A so that a current $I_L$ can flow through the inductor L (possibly in opposite directions, as discussed in the following). An output capacitor C is arranged intermediate the output nodes 14A, 14B to be charged to the output voltage Vout.

The node B is coupled to the second input node 12B with the "high-side" electronic switches $S_H$ and $S_{DH}$ coupled to the first output node 14A at their sides opposed to the nodes A and B, respectively.

The "low-side" electronic switches $S_L$ and $S_{DL}$ are coupled to the second output node 14B at their sides opposite the nodes A and B.

One or more embodiments rely on the recognition that control circuitry (not visible in FIG. 1 for simplicity and discussed in the following in connection with FIG. 9) can be provided and configured to control switching of the electronic switches $S_H$, $S_L$ (and $S_{DH}$, $S_{DL}$).

For instance, that control circuitry can be configured to control switching of the electronic switches $S_H$, $S_L$ (and $S_{DH}$, $S_{DL}$) for Vin>0 according to the exemplary switching table (Table I) reproduced below.

In Table I, as otherwise conventional in the art: an electronic switch being indicated to be "ON" is indicative of such a switch being in a conductive state, and an electronic switch being indicated to be "OFF" is indicative of such a switch being in a non-conductive state.

TABLE I

| Switching pattern of switches $S_H$, $S_L$, $S_{DH}$, $S_{DL}$ for Vin > 0 | | | | |
|---|---|---|---|---|
| Switch | Inductor L charge (until $I_L < I_F$*) | Tvout_Vds (dead time) | Inductor L discharge (until $I_L > I_R$*) | Tzero_Vds (dead time) |
| $S_L$ | ON | OFF | OFF | OFF |
| $S_H$ | OFF | OFF | ON | OFF |
| $S_{DL}$ | ON | ON | ON | ON |
| $S_{DH}$ | OFF | OFF | OFF | OFF |

As discussed in the following in connection with FIG. 9, the electronic switches $S_{DH}$, $S_{DL}$ can be controlled synchronously with an input voltage Vin being an AC (50 Hz-60 Hz) signal with the aim of controlling the general rectifying action performed by the converter 10 on the (sinusoidal) waveform of the input voltage Vin.

No switching action of the electronic switches $S_{DH}$, $S_{DL}$ is shown in Table I: in fact, these switches $S_{DH}$, $S_{DL}$ alternate their ON/OFF states at subsequent half-waves of the input voltage signal Vin. Table I above refers to a single half-wave of the input voltage signal Vin: consequently, the switches $S_{DH}$, $S_{DL}$ are shown as being steadily ON or OFF.

Operation of the low-frequency LF circuitry controlling the electronic switches $S_{DH}$, $S_{DL}$ is otherwise conventional in the art, which makes it unnecessary to provide a more detailed description herein. The exemplary description herein is primarily concerned with controlling the electronic switches $S_H$, $S_L$ in a resonant ZVS operation mode.

The lines reproduced in continuous line and dashed line are indicative of possible flow paths of currents through the circuit 10 in response to the various switching conditions of the electronic switches, which facilitates obtaining a triangular shape for the current $I_L$ through the inductor L in FIG. 1.

Figure 2:
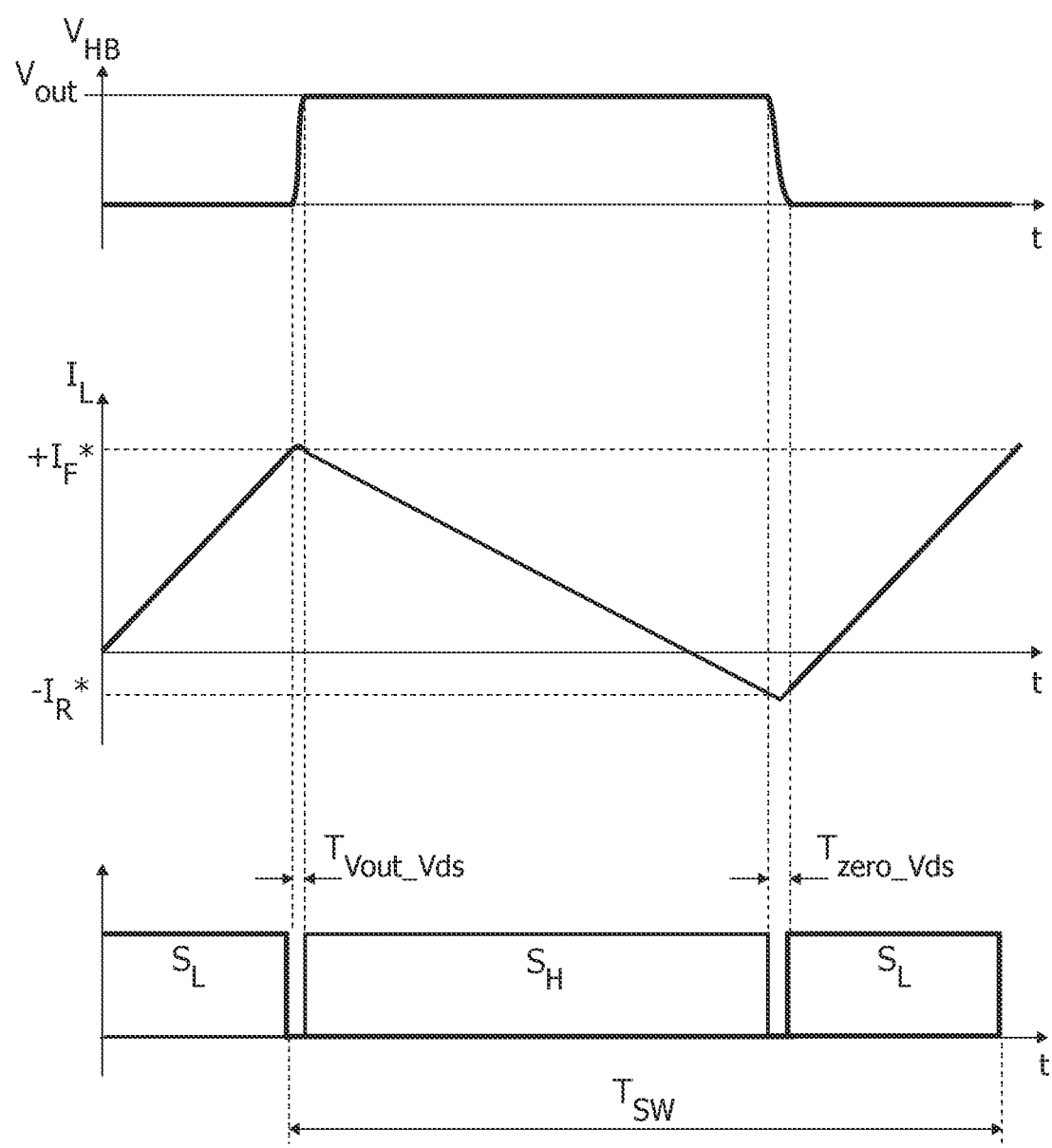
FIG. 2 is a time diagrams exemplary of possible time behaviors of signals which may occur in a converter according to FIG. 1.

This possible type of operation is illustrated in FIG. 2, where various diagrams are reproduced sharing a common time (abscissa) scale.

Specifically: the top diagram in FIG. 2 is illustrative of a possible time behavior of the voltage $V_{HB}$ across the switch $S_L$ (see also FIG. 1), with that voltage varying between zero and the output voltage Vout; the intermediate diagram in FIG. 2 is illustrative of a possible time behavior of the current $I_L$ through the inductor L, which exhibits a triangular shape between $+I_F^*$ and $-I_R^*$; and the bottom diagram in FIG. 2 is illustrative of the times the switches $S_L$ and $S_H$ are conductive (signal "high"), with a switching period $T_{SW}$.

The time intervals Tvout_Vds and Tzero_Vds appearing in Table 1, are also indicated in the time (abscissa) scale t. These time intervals represent the dead times during which both switches $S_L$ and $S_H$ are in a non-conductive ("off") state (signal "low" in the bottom diagram of FIG. 2).

One or more examples herein can exploit the possibility of controlling the switches $S_H$, $S_L$ (in a manner known per se to those of skill in the art) in order to produce in a ZVS mode of operation a triangular waveform of the current $I_L$ in such a way that the current $I_L$ flowing through the inductor L varies between a first current threshold $+I_F^*$ and a second current threshold $-I_R^*$ with a triangular waveform having rising and falling edges alternating with a switching frequency fsw.

In examples as considered herein the first current threshold $+I_F^*$ is positive and the second current threshold $-I_R^*$ is negative (that is, the first current threshold and the second current threshold have opposite signs), and: for positive values of the current $I_L$, the current $I_L$ flows in a first flow direction from the input node 12A towards the node A (that is, towards the switching circuitry comprising the switches $S_H$, $S_L$, $S_{DH}$ and SQL); and for negative values of the current $I_L$, the current $I_L$ flows (as a reverse current) in a second flow direction, opposite the first flow direction, that is from the node A (that is, from the switching circuitry comprising the switches $S_H$, $S_L$, $S_{DH}$ and $S_{DL}$) towards the input node 12A.

It will be otherwise noted that the two reference thresholds for the current through the inductor, namely $I_F^*$ and $I_R^*$ can take values which are positive, negative or zero, independently of each other, taking into account the operating principle and the operation mode of the converter (e.g., CCM, DCM, TM, ZVS and so on), so that the flow direction of the current $I_L$ through the inductor need not necessarily be reversed.

Diagrams as exemplified in FIG. 2 are exemplary of operation of a circuit such as the circuit 10 which facilitates reaching ZVS (Zero Voltage Switching) or VS (Valley Switching) characteristics.

Such a ZVS control can be envisaged to be applied only for input voltages Vin higher than Vout/2 insofar as the electronic switches may start to conduct on voltages still high which is detrimental to efficiency of operation. This is under the assumption that for Vin≤Vout/2, ZVS condition can be achieved automatically.

As discussed, a problem with ZVS control may be related to the switching frequency of the triangular waveform of the current $I_L$, that is the frequency of alternation of the rising edges during which the current $I_L$ increases (from $-I_R^*$ to $+I_F^*$) and the falling edges during which the current $I_L$ decreases (from $+I_F^*$ to $-I_R^*$): see the intermediate diagram in FIG. 2.

As noted, in the case of a power factor control (PFC) with variable frequency, such a frequency may become undesirably high at zero crossings of the input voltage and in the presence of a light load.

An undesirably high switching frequency may adversely affect the control action and is likely to increase switching losses in the semiconductor devices in the converter 10 while also increasing the overall losses in the system.

For that reason, reducing, limiting and/or controlling the switching frequency may represent a desirable option.

For instance, United States Patent Application Publication No. 2017/0110981 (incorporated herein by reference) discloses a method for decreasing frequency in a converter: if the output load decreases and/or the working frequency becomes too high, the control system introduces high-frequency burst cycles where the OFF period is modulated. The burst cycles are applied to the driving signals as soon as the frequency increases. In that way, the working frequency and switching losses are reduced.

A disadvantage of that approach lies in that Total Harmonic Distortion (THD) and Power Factor (PF) performance may be adversely affected in so far as burst cycles introduce discontinuities in the inductor current.

Also, the instantaneous average current during a burst cannot be made proportional to the input voltage.

Figure 3:
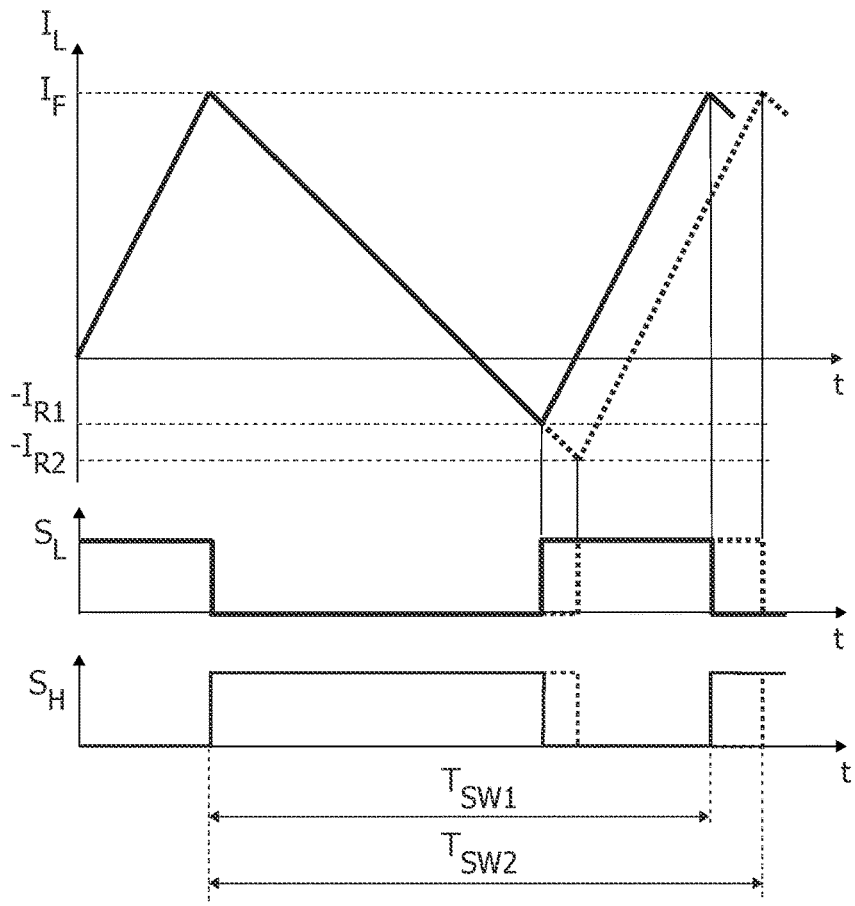
FIG. 3 is a diagram exemplary of possible frequency reduction which can obtained with reverse inductor current control in compliance with the present description.
Figure 3:
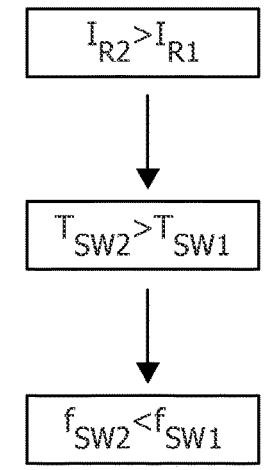

FIG. 3 is illustrative of how these issues can be addressed in examples as discussed herein.

In FIG. 3 various diagrams are reproduced sharing a common time (abscissa) scale.

More specifically: the top diagram of FIG. 3 is illustrative of a possible time behavior of the current $I_L$ through the inductor L, which again exhibits a triangular shape between a first, positive threshold $+I_F^*$ having a value $+I_F$ and a second, negative threshold $-I_R^*$, for which two possible values are illustrated, $-I_{R1}$ and $-I_{R2}$; and the bottom diagram of FIG. 3 is illustrative of the times the switches $S_L$ and $S_H$ are conductive (signal "high"), with possibly different switching periods $T_{SW1}$ and $T_{SW2}$ (and frequencies) as a function of whether the value $-I_{R1}$ or the value $I_{R2}$ is used for the negative threshold $-I_R^*$.

FIG. 3 (for simplicity, the dead times Tvout_Vds and Tzero_Vds of FIG. 2 are not visible in FIG. 3) highlights a concept underlying various examples as discussed herein: when plural (e.g., two) different values are applied for the reverse current, namely $-I_{R1}$ and $-I_{R2}$ (with $|I_{R2}|>|I_{R1}|$), the turn-on and turn-off instants of the switches $S_L$ and $S_H$ are changed.

This results into two different switching (alternation) periods for the triangular waveform of the current $I_L$ through the inductor, $T_{SW1}$ and $T_{SW2}$ (with, e.g., $T_{SW2}>T_{SW1}$).

Due to the inverse relationship between period T and frequency f (that is, f=1/T) this will likewise result into two different switching frequencies ($f_{SW1}$ and $f_{SW2}$, with, e.g., $f_{SW2}<f_{SW1}$) in the alternation of the rising and falling edges of the triangular waveform of the current $I_L$ through the inductor L.

That is, if the (absolute) value of the reverse current is increased from $I_{R1}$ to $I_{R2}$, the switching frequency is reduced.

In fact, such a switching frequency (that is the frequency of alternation of the times during which the current $I_L$ increases and the times during which the current $I_L$ decreases) is an inverse function of the distance (that is, the difference) between the first current threshold $I_F^*$ and the second current threshold $-I_R^*$.

The switching frequency can thus be controlled varying the distance between the first current threshold $I_F^*$ and the second current threshold $-I_R^*$.

For instance, the switching frequency can be reduced by increasing the distance between the first current threshold $I_F^*$ and the second current threshold $-I_R^*$.

As exemplified herein for simplicity, varying the distance between the first current threshold $I_F^*$ and the second current threshold $-I_R^*$ may involve varying (only) the second current threshold $-I_R^*$ (e.g., changing from $-I_{R1}$ to $-I_{R2}$ in FIG. 3) and maintaining the first current threshold ($I_F^*=I_{F1}$ in FIG. 3).

Certain examples, not illustrated here for simplicity, may involve varying (only) the first current threshold $I_F^*$ and maintaining the second current threshold ($-I_R^*$) or varying both the first current threshold $I_F^*$ and the second current threshold $-I_R^*$.

This facilitates maintaining the average instantaneous current through the inductor L as discussed in the following in connection with FIG. 4 (which is not feasible in the case of the burst cycles of United States Patent Publication No. 2017/0110981 cited above).

One or more embodiments may be based on the recognition of the advantage of intervening on the value of $I_R$ also for Vin<Vout/2.

The diagrams of FIGS. 4 to 8 are illustrative of various ways of controlling the current $I_L$ in a converter such as, by way of example, a PFC bridgeless totem pole converter, as exemplified FIG. 1.

The diagrams of FIGS. 4 to 8 are exemplary of the time behavior of a positive half wave $V_{IN}$ of the input voltage Vin (here assumed to be substantially sinusoidal) portrayed against possible time behaviors of the current $I_L$ through the inductor L if ZVS operation with hysteresis current control is implemented.

In that case, the current $I_L$ exhibits a sort of zig-zag pattern at a frequency higher than the frequency of the input voltage Vin with the (upper) peaks of the current having a substantially sinusoidal envelope at the same frequency of, and in-phase with, the half wave $V_{IN}$ of the input voltage Vin.

As represented in FIGS. 4 to 8, the AC input signal Vin applied across the first input node 12A and the second input node 12B has a period encompassing a plurality of periods (see, $T_{SW}$ in FIG. 2) of the triangular waveform of the current through the inductor L that is coupled, on the one side, to the node A (that is, to the switching network comprising the switches $S_L$ and $S_H$), and, on the other side, to the node 12A (with the provision of a current sensor, as further discussed in the following).

The diagrams of FIGS. 4 to 8 are intended to distinguish between: "standard" reverse operation, where reverse inductor current can be applied only for Vin>Vout/2, as discussed previously; and "extended" reverse operation (where reverse inductor current IR can be applied also when Vin≤Vout/2, that is over the whole input signal amplitude range of the AC input signal applied across the first input node and the second input node.

Figure 4:
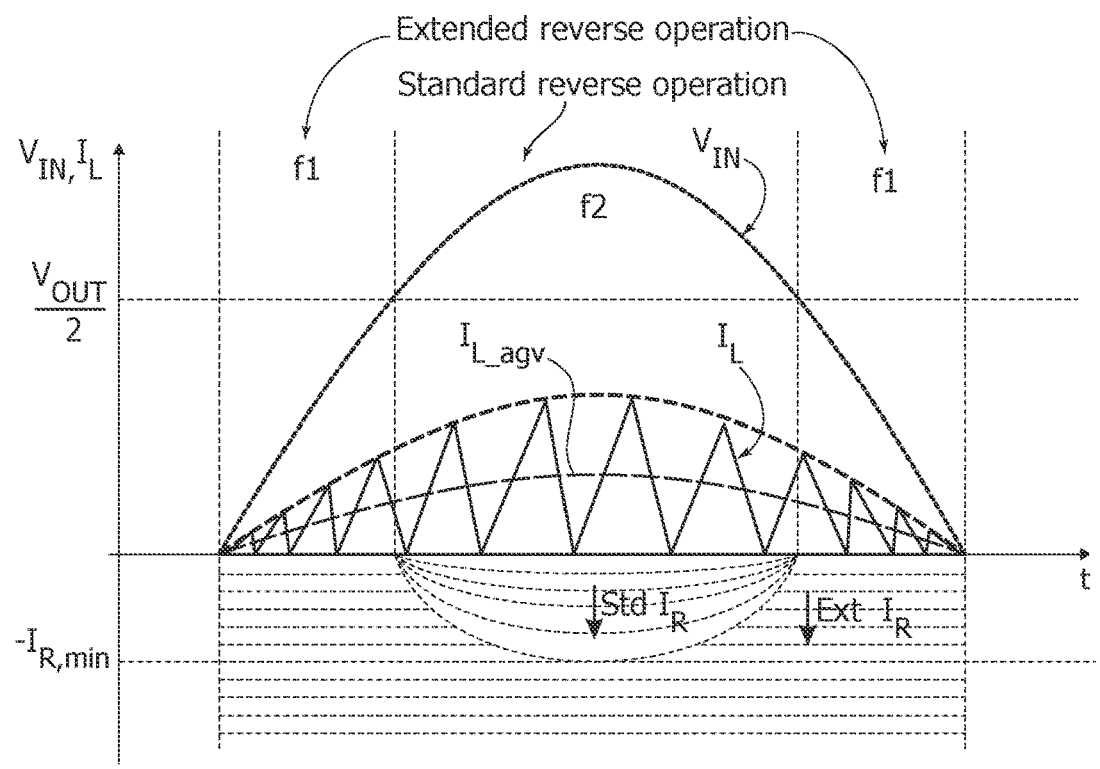
FIGS. 4 to 8 are time diagrams exemplary of possible time behaviours of voltage and current signals in a converter as exemplified in FIG. 1.

The diagram of FIG. 4 is exemplary of a conventional transition mode where the sign (or direction of flow) of the current $I_L$ through the inductor L is not reversed (inverse current $I_R$ [%]=0) so that the current $I_L$ flows through the inductor L towards the input node 12A with a triangular waveform which "toggles" between valley points at a constant reference value (e.g., zero) and peaks which are distributed along a half-sinusoidal envelope indicated by a dotted line.

As illustrated, the "instantaneous" average value of the triangular inductor current waveform (designated $I_{L\_avg}$ in FIG. 4) is located essentially halfway the distance between the valley points and the peaks and is related to the instantaneous power transferred from the input source of the converter towards the load.

In PFC applications, a desired shape for IL_avg is a sinusoidal shape and in phase with the AC input voltage source.

In the presence of a light load, for instance, these peaks will have a reduced (small) value, so that the triangular current waveform for $I_L$ will "take little time" in going from the valley points to the peaks and vice-versa. This may result in an undesired increase of the frequency of the switching signals for the switches $S_L$ and $S_H$, with the disadvantages discussed in the foregoing.

In FIG. 4, the average switching frequency for the extended reverse operation (that is Vin≤Vout/2) is indicated with f1 and the average switching frequency for standard reverse operation (that is Vin>Vout/2) is indicated with f2.

These average switching frequencies, f1 and f2, are taken as reference for the subsequent figures in order to compare the average switching frequency variation caused by reverse current application in the portion of the input signal range that is considered.

Figure 5:
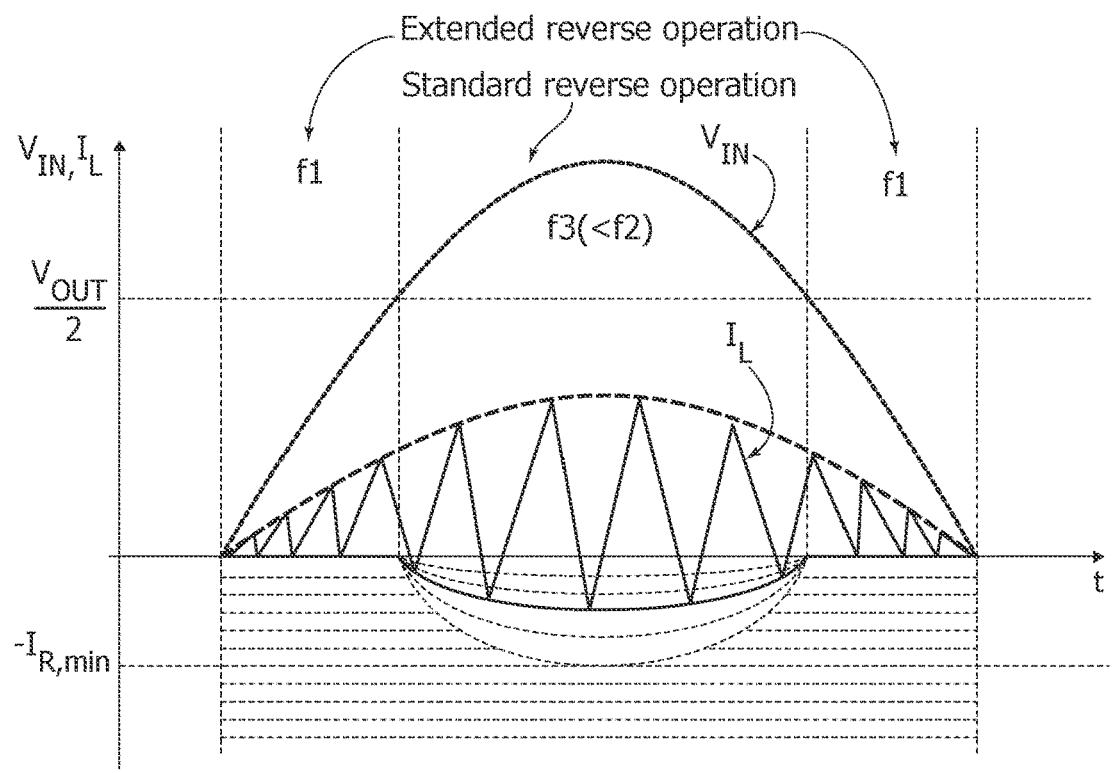

The diagram of FIG. 5 is exemplary of a situation where, during standard reverse operation (that is Vin>Vout/2), a reverse current is caused to flow through the inductor L to reach valley points of the triangular waveform of the current $I_L$ below the reference value considered previously.

In that way, the average switching frequency for standard reverse operation changes to a "new" value f3, which is lower than the previous value f2 in that portion of the input signal range (f3<f2).

The shape for the (approximately half-oval) envelope for this reverse current, that is the locations of the valley points below the reference value considered previously, may be obtained (in a manner known per se to those of skill in the art) from calculations (for instance from the differential equations ruling operation of the system).

In the diagram of FIG. 5, outside standard reverse operation (that is in case Vin≤Vout/2) no reverse current is contemplated so that for Vin≤Vout/2 the triangular current waveform for $I_L$ has valley points still arranged at the reference value considered previously. Hence, the average switching frequency outside standard reverse operation is still f1. The diagram of FIG. 6 is exemplary of a situation where, still only during standard reverse operation (that is Vin>Vout/2), a reverse current is caused to flow through the inductor L to reach valley points which are distributed along an envelope for the reverse current reaching a lowest point (minimum value $-I_{R,\,min}$) at the peak input operating voltage $V_{IN}$, that is for the peak value of the voltage $V_{IN}$.

Hence the average switching frequency in standard reverse operation will be f4, that is a frequency lower than in the previous case (f4<f3), while no frequency variation is observed outside standard reverse operation.

Figure 6:
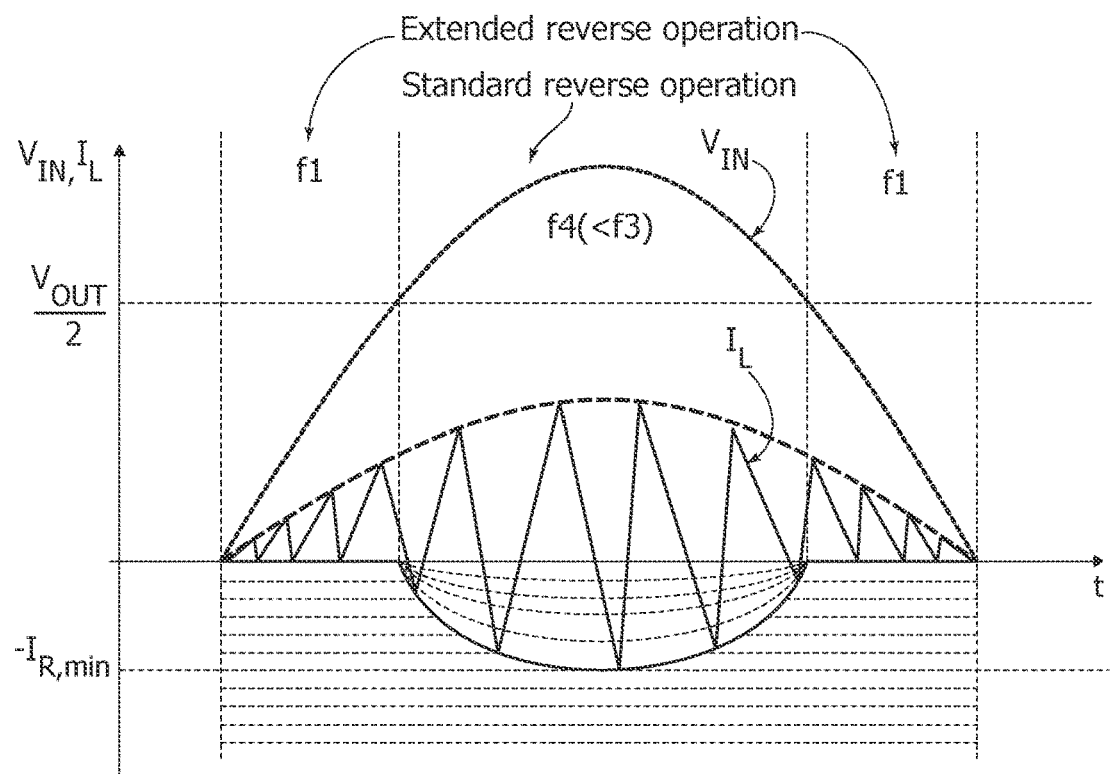

The conditions portrayed in FIG. 5 can thus be regarded as exemplary of a "standard" reverse current having reached, e.g., 50% of its expected value, while the conditions portrayed in FIG. 6 can be regarded as exemplary of a "standard" reverse current having reached 100% of its expected value.

In both instances of FIGS. 5 and 6, a reverse current is caused to flow through the inductor L only during standard operation (that is for Vin>Vout/2), so that no reverse current flows through the inductor L for Vin≤Vout/2).

Hence a frequency variation is observed only inside the standard reverse operation portion of the input signal range.

Figure 7:
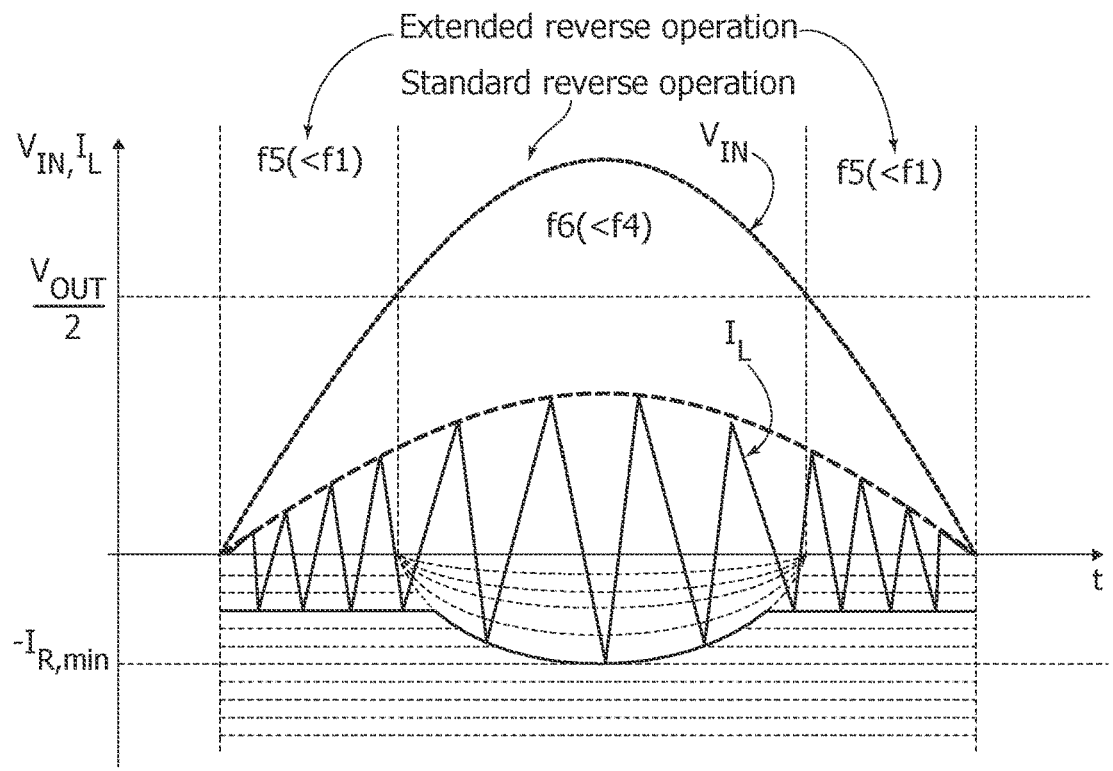

The diagram of FIG. 7 is exemplary of a mode of operation where: operation as discussed in connection with FIG. 6 is implemented during standard reverse operation (that is Vin>Vout/2); and a reverse current is caused to flow through the inductor L also for Vin≤Vout/2 to provide "extended" reverse operation wherein a reverse current is caused to flow through the inductor L to reach valley points which are distributed at a value of, e.g., 50% the minimum value $-I_{R,min}$.

That is, in FIG. 7, a reverse inductor current is applied over the whole period of the AC input signal Vin with the current $I_L$ flowing through the inductor L having constant valley values at 50% or $-I_{R,min}$ over a portion (extended reverse operation) of the plurality of periods $T_{SW}$ of the triangular waveform of the current through the inductor L encompassed by the period of the AC input signal Vin applied across the first input node 12A and the second input node 12B.

In this case also the average switching frequency variation (compared with FIG. 6) is observed over the whole AC input signal period, with values f5 (extended reverse operation) and f6 (standard reverse operation) for which the conditions f6<f4 and f5<f1 will apply.

Figure 8:
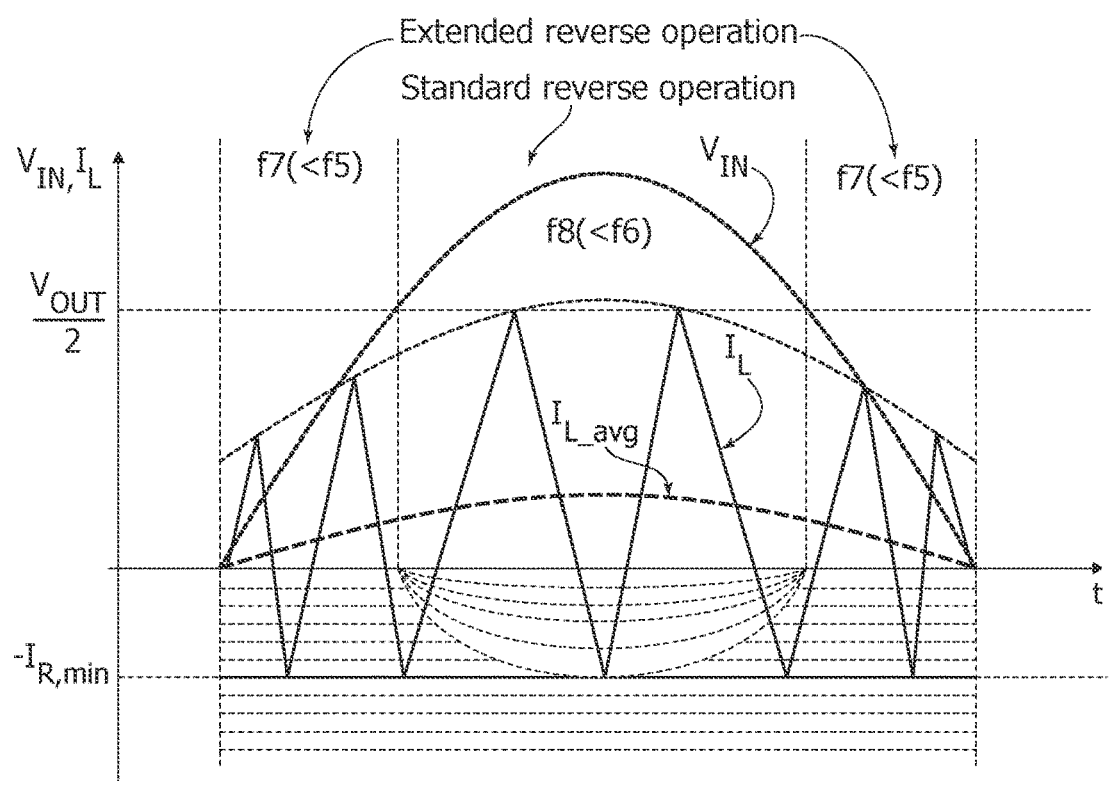

Finally, the diagram of FIG. 8 is exemplary of operation wherein both during standard reverse operation (that is, Vin>Vout/2) and during extended reverse operation (that is, Vin≤Vout/2 a reverse current is caused to flow through the inductor L to reach valley points which all correspond to the minimum value $-I_{R, min}$.

That is, in FIG. 8, a reverse inductor current is applied over the whole period the AC input signal Vin with the current $I_L$ flowing through the inductor L having constant valley values $-I_{R, min}$ over the entirety of the periods $T_{SW}$ of the triangular waveform of the current through the inductor L encompassed by the period of the AC input signal Vin applied across the first input node 12A and the second input node 12B.

Moreover, in FIG. 8, the envelope of the peaks of the current $I_L$ has been increased in order to maintain the same desired average inductor current $I_{L\_avg}$ that is sinusoidal and in phase with the AC input voltage source, as discussed in the case of FIG. 4.

The conditions portrayed in FIG. 7 can thus be regarded as exemplary of a "standard" reverse current having reached 100% of its expected value and an "extended" reverse current having reached 50% of its expected value.

The conditions portrayed in FIG. 8 can be regarded as exemplary of both the "standard" reverse current and the "extended" reverse current having reached 100% of their expected value.

More generally:
the operating conditions portrayed in FIGS. 7 and 8 are exemplary of operation modes where a reverse inductor current (negative values for the current $I_L$) can occur during the entirety of the periods $T_{SW}$ of the triangular waveform of the current through the inductor L encompassed by the period of the AC input signal Vin applied across the first input node 12A and the second input node 12B, and
the operating conditions portrayed in FIGS. 5 and 6 are exemplary of operation modes where a reverse inductor current (negative values for the current $I_L$) can occur (only) during standard reverse operation, namely only during a portion of the periods $T_{SW}$ of the triangular waveform of the current through the inductor L encompassed by the period of the AC input signal Vin applied across the first input node 12A and the second input node 12B.

In comparison with the inductor current control illustrated in the diagram of FIG. 4, the operating condition exemplified in the diagrams of FIGS. 5 to 8 have the effect of (increasingly) bringing at least a portion of the valley points of the current farther away from the peak points. This corresponds to increasing the distance between the first and second reference thresholds $I_F^*$ and $-I_R^*$ used for hysteresis current control.

In the presence of a light load, for instance, with these peaks having a reduced value, the triangular current waveform for $I_L$ will thus "take more time" (in comparison with the situation portrayed in FIG. 4) in going from the valley points to the peaks and vice-versa so that the switching frequency (fsw) associated with the alternations of the rising and falling edges in the triangular waveform of the current $I_L$ through the inductor L will be reduced.

This will facilitate countering an undesired increase of the frequency of the inductor current waveform.

The block diagram of FIG. 9 is exemplary of the possibility of associating with a circuit essentially as discussed previously in connection with FIG. 1 a control circuit 1000 which may be configured to implement the standard reverse operation/extended reverse operation options discussed previously.

For simplicity, parts or elements like parts or elements already discussed in connection with FIG. 1 are indicated with like reference symbols in Figure; a corresponding detailed description will not be unnecessarily repeated.

A control circuit 1000 as portrayed in FIG. 9 is configured for controlling (in manner known per se to those of skill in the art—see the previous discussion related to FIG. 1 and Table I) the electronic switches $S_H$, $S_L$ and $S_{DH}$, $S_{DL}$.

This may occur, for instance, via:
a high-frequency (HF) leg hysteresis current control circuit (CCC) 1002 that controls the electronic switches $S_H$, $S_L$ and thus controls the frequency of alternation of rising and falling edges in the triangular waveform of the current $I_L$ through the inductor L, and
a low-frequency (LF) leg control circuit (CC) 1004 that controls the electronic switches $S_{DH}$, $S_{DL}$ and thus controls primarily the general rectifying action performed by the converter 10 on the (sinusoidal) waveform of the input voltage Vin (e.g., 50 Hz-60 Hz mains voltage).

To that effect, in a control circuit 1000 as portrayed in FIG. 9, the input voltage Vin is sensed along with the current $I_L$ through the inductor L via sensing lines of a type known per se to those of skill in the art (e.g., in so far as the current $I_L$ is concerned, via a current sensor arrange between the node 12A and the inductor L).

As noted, operation of the low-frequency (LF) leg control circuit 1004 is conventional in the art, which makes it unnecessary to provide a more detailed description herein.

In a control circuit 1000 as portrayed in FIG. 9, the input voltage Vin is also applied to a combination node 1006 together with an output signal from a voltage control circuit 1008 which is sensitive to the output voltage Vout, the output current Iout and an associated output voltage reference Vout_ref.

To that effect, in a control circuit 1000 as portrayed in FIG. 9, the output voltage Vout is sensed along with the output current Tout applied to the load EL via sensing lines of a type known per se to those of skill in the art.

In a control circuit 1000 as portrayed in FIG. 9, the combination node 1006 is configured to provide to a peak/valley current control block 1010 a signal Ipk_ref which is essentially indicative of values of the peaks of the current $I_L$ through the inductor L (see the diagrams of FIGS. 4 to 8).

The high-frequency leg hysteresis current control circuit 1002 is configured to produce a signal fsw indicative of the (switching) frequency of the driving signals of the switches $S_L$ and $S_H$ that determines the frequency of alternation of rising and falling edges in the triangular waveform of the current $I_L$ through the inductor L.

For instance, the circuit block 1002 may perform a hysteresis current control receiving as an input (in addition to a sensed value of the current through the inductor $I_L$), a high (peak) current threshold IF*, a low (valley) current threshold IR* and the dead time values (Tvout_Vds and Tzero_Vds) from the block 1010.

The block 1002 outputs the signals $S_L$ and $S_H$ (according to the sequence of Table 1, for instance), as well as a measure (obtained, e.g., via one or more timers) of the frequency fsw of these signals, which is returned to the block 1010 for frequency control.

As illustrated in FIG. 9, the peak/valley current control block 1010 receives (in addition to the switching frequency signal fsw) signals that are indicative, e.g., of the input voltage Vin, the output voltage Vout, the output signal Ipk_ref (indicative of values of the peaks of the current $I_L$ through the inductor L) from the combination node 1006 and a set of optional parameters OP of the converters (THD, efficiency etc.) which may be optionally used as inputs for converter control.

The circuit 1010 is configured to implement, based on those signals, a hysteresis current threshold control (peak IF* and valley IR* current thresholds) in order to control/ modify the switching frequency fsw, as discussed in the foregoing in connection with FIGS. 4 to 8, producing— optionally adopting—"extended" reverse operation (that is irrespective of the relative values of the input voltage Vi and the output voltage Vout).

It is otherwise noted that the examples discussed herein deal primarily with the possibility of controlling the switching frequency fsw varying the distance between the first current threshold $I_F^*$ and the second current threshold $-I_R^*$ rather than with the criteria adopted for controlling that frequency as a function of parameters such as the input voltage Vin, the output voltage Vout, the output signal Ipk_ref or any other parameters OP of the converter (THD, efficiency etc.) used as inputs for converter control.

Those of skill in the art will thus appreciate that the examples discussed herein are largely "transparent" with respect of the criteria adopted for controlling that frequency as a function of various parameters.

In (exemplary and non-limiting) architecture as illustrated in FIGS. 1 and 9 (and to Table I discussed previously) the first input node 12A is coupled via the inductor L (through the inductor current sensor such as $I_{SL}$ to the intermediate node A in the switching network $S_H$, $S_L$, $S_{DH}$, $S_{LH}$ in the converter circuit 10.

As illustrated, the first intermediate node A can be coupled: to the first output node 14A via the first electronic switch $S_H$ (when made conductive), and to the second output node 14B (through the load current sensor OS) in response to the second electronic switch $S_L$ being made conductive).

During converter operation as considered herein by way of example, the switching network in the converter circuit (primarily the switches $S_H$, $S_L$, in so far as hysteresis current control operation is concerned) operates as follows:

i) during inductor charge, the switch $S_L$ is made conductive and the switch $S_H$ non-conductive (until the inductor current reaches the first current threshold $I_F^*$) and then the switch $S_L$ is made non-conductive and the switch $S_H$ conductive in alternation with the switch $S_L$; the dead time TVout_Vds is the time delay between the turn-off time of the switch $S_L$ and the turn-on time of the switch $S_H$, hence during this dead time both switches $S_L$ and $S_H$ are non-conductive (see Table 1 and FIG. 2 for the switching sequence), and ii) during inductor discharge, the switch $S_H$ is made conductive and the switch $S_L$ non-conductive (until the inductor current reaches the second current threshold $-I_R^*$) and then the switch $S_H$ is made non-conductive and the switch $S_L$ conductive in alternation with the switch $S_H$. The dead time Tzero_Vds is the time delay between the turn-off time of the switch $S_H$ and the turn-on time of the switch $S_L$, hence during this dead time both switches $S_L$ and $S_H$ are non-conductive (see again Table 1 and FIG. 2 for the switching sequence).

To that effect, during reverse operation, the switching network (primarily the switches $S_H$, $S_L$) in the converter 10 can be controlled as discussed by controlling the intensity of the current flowing from the switching network $S_H$, $S_L$ to the first input node 12A (through the inductor current sensor) via the low current threshold IR* control in order to modify the resulting switching frequency fsw as discussed in connection with FIG. 3.

It is noted that the benefit in reducing the frequency fsw are dominant for light loads: for instance, the maximum value fmax for the frequency fsw may be almost halved in response to extended reverse operation being applied as discussed previously.

It is similarly noted that in response to an extended reverse operation being fully applied (see for instance FIG. 8) the value for fmax decreases, with an evident reduction in the average value favg for the frequency fsw. Also, it is noted that the lowest (minimum) frequency value fmin is practically constant.

Total system losses are found to decrease at least until conduction losses become dominant (in fact, total losses are mainly the result of a combined inductor and device losses).

Once a limit is set for the maximum frequency value fmax, an extended reverse operation as exemplified herein also facilitates further improving efficiency in comparison with standard reverse operation.

Use of embodiments can be revealed by noting that— when embodiments are applied—the reverse charging current may be different from a lowest (minimum) value related to the specific operation point by also noting that embodiments involve applying a reverse current also for Vin<Vout/ 2, especially for light loads with a resulting reduction in the switching frequency.

Examples presented in the foregoing may involve activating the switching frequency control method discussed herein over the whole period of an AC input signal (e.g., Vin) with the current $I_L$ flowing through the inductor L having an arbitrary shape of the envelope of the valley values: FIGS. 5 to 8 are exemplary of this.

Examples presented in the foregoing may involve activating the switching frequency control method discussed herein over the whole period of an AC input signal (e.g., Vin) with the current $I_L$ flowing through the inductor L having an arbitrary shape of the envelope of the peak values.

Examples presented in the foregoing may involve activating the switching frequency control method discussed herein over the whole period of an AC input signal (e.g., Vin) with the current $I_L$ flowing through the inductor L having an arbitrary shape of the envelope of both the valley and the peak values.

Examples presented in the foregoing may involve activating the switching frequency control method discussed herein also or exclusively based on one or a combination of optional parameters of the converter (THD, efficiency and so on).

Those of skill in the art will appreciate that operation as exemplified herein primarily in connection with a Zero Voltage Switching (ZVS) operation mode are applicable also to other operation modes such as, e.g., Continuous Conduction Mode (CCM), Discontinuous Conduction Mode (DCM) or Transition Mode (TM), for instance.

Those of skill in the art will similarly appreciate that the topology of the converter 10 illustrated herein is merely exemplary. Examples as discussed herein are applicable to different converter topologies such as buck, boost, buck-boost, flyback, Single-Ended Primary Inductor Converter (SEPIC), and so on.

Consequently, the two reference thresholds for the current through the inductor, namely $I_F^*$ and $I_R^*$ can take values which are positive, negative or zero, independently of each other, taking into account the operating principle and the operation mode of the converter (e.g., CCM, DCM, TM, ZVS and so on).

The embodiments may apply to various conversion approaches (AC/DC, DC/AC, DC/DC and AC/AC, for instance), with no limitations. This applies primarily, but not exclusively, to the switch configuration.

In that respect it is noted the switches $S_H$, $S_L$, $S_{DH}$, $S_{LH}$ can be implemented with different types of switches (e.g., MOSFET, IGBT, SCR, and so on) and technologies (Si, SiC, GaN, for instance), and/or in any configuration, connection or combination (e.g., series connection, parallel connection, cascode, and so on).

Examples as presented herein are applicable to all types of converters where a control system as represented by blocks 1002 and 1010 in FIG. 9 can be configured to control a switching network (for instance, a switching network such as the switching network comprising the switches $S_H$, $S_L$, $S_{DH}$, and $S_{LH}$ as illustrated in FIGS. 1 and 9 operated in compliance with Table 1) based on the comparison between the current intensity value $I_L$ read by a current sensor such as $I_{SL}$ (set between the node 12A and the inductor L) and two reference thresholds $I_F^*$ and $-I_R^*$, where the first (upper) threshold $I_F^*$ provides the instantaneous peak value of the current through the inductor L, and the second (lower) threshold $-I_R^*$ provides the instantaneous valley value of the current through the inductor L.

The associated triangular waveform thus "toggles" between a first current threshold $I_F^*$ and a second current threshold $-I_R^*$ with a frequency fsw of switching between rising and falling edges which is an (inverse) function of the distance (difference) between the first current threshold $I_F^*$ and the second current threshold $-I_R^*$.

The switching frequency fsw can thus be controlled varying the distance between the first current threshold $I_F^*$ and the second current threshold $-I_R^*$, for instance reducing the switching frequency by increasing the distance between the first current threshold $I_F^*$ and the second current threshold $-I_R^*$.

As illustrated, varying the distance between the first current threshold $I_F^*$ and the second current threshold $-I_R^*$ may comprise varying (only) the second current threshold $-I_R^*$ and maintaining the first current threshold $I_F^*$.

In certain embodiments, the converter may comprise two or more individual converters arranged in parallel (with interleaved architecture, for instance).

Without prejudice to the underlying principles, the details and embodiments may vary, even significantly, with respect to what has been described by way of example only without departing from the extent of protection.

The claims are an integral part of the technical teaching on the embodiments as provided herein.

The extent of protection is determined by the annexed claims.

The invention claimed is:

1. A method, comprising:
converting an input signal applied across a first input node and a second input node of a converter circuit into an output signal across a first output node and a second output node of the converter circuit, wherein converting is performed by a switching network of the converter circuit arranged intermediate the first and second input nodes and the first and second output nodes, the switching network coupled to the first input node via an inductor having a current flowing therethrough;
activating a hysteresis current control mode of the switching network wherein the current flowing through the inductor varies between a first current threshold and a second current threshold with a triangular waveform having rising and falling edges alternating with a switching frequency; and
controlling said switching frequency by adjusting one or more of the first and second current thresholds to vary a distance between the first current threshold and the second current threshold;
wherein the input signal applied across the first input node and the second input node comprises an AC signal having a half period encompassing a plurality of alternations of rising and falling edges of said triangular waveform; and
wherein adjusting the one or more of the first and second current thresholds is applied over an entirety of the half period of the AC signal.

2. The method of claim 1, wherein said switching frequency is an inverse function of the distance between the first current threshold and the second current threshold, and wherein controlling said switching frequency comprises reducing said switching frequency by increasing the distance between the first current threshold and the second current threshold.

3. The method of claim 1, wherein adjusting to vary the distance between the first current threshold and the second current threshold comprises varying the second current threshold and maintaining the first current threshold.

4. The method of claim 1, wherein adjusting to vary the distance between the first current threshold and the second current threshold is performed as a function of entities selected from the group consisting of:
an input voltage to the converter circuit;
an output voltage of the converter circuit;
a reference signal indicative of peak values of the current through the inductor; and
at least one converter control parameter.

5. The method of claim 1, wherein the first current threshold and the second current threshold have opposite signs, and wherein the current flowing through the inductor during said hysteresis current control mode flows alternately in a first flow direction from the first input node to the switching network and in a second flow direction from the switching network to the first input node.

6. The method of claim 1, wherein controlling said switching frequency comprises varying a duration of at least one dead time value of the switching network in response to activation of said hysteresis current control mode.

7. The method of claim 1, further comprising activating said hysteresis current control mode of the switching network in the converter circuit irrespective of relative values of the input signal and the output signal.

8. The method of claim 1, wherein adjusting is applied over all of an input signal amplitude range of the AC signal during the half period.

9. A method, comprising:
converting an input signal applied across a first input node and a second input node of a converter circuit into an output signal across a first output node and a second output node of the converter circuit, wherein converting is performed by a switching network of the converter circuit arranged intermediate the first and second input nodes and the first and second output nodes, the switching network coupled to the first input node via an inductor having a current flowing therethrough;
activating a hysteresis current control mode of the switching network wherein the current flowing through the inductor varies between a first current threshold and a second current threshold with a triangular waveform having rising and falling edges alternating with a switching frequency; and
controlling said switching frequency by adjusting one or more of the first and second current thresholds to vary a distance between the first current threshold and the second current threshold;
wherein the input signal applied across the first input node and the second input node comprises an AC signal having a period encompassing a plurality of alternations of rising and falling edges of said triangular waveform of the current through the inductor coupling the switching network and the first input node; and
activating said hysteresis current control mode of the switching network in the converter circuit over the whole period of the AC input signal with the current flowing through the inductor having constant valley values over a portion of said plurality of alternations of rising and falling edges of said triangular waveform of the current through the inductor.

10. A method, comprising:
converting an input signal applied across a first input node and a second input node of a converter circuit into an output signal across a first output node and a second output node of the converter circuit, wherein converting is performed by a switching network of the converter circuit arranged intermediate the first and second input nodes and the first and second output nodes, the switching network coupled to the first input node via an inductor having a current flowing therethrough;
activating a hysteresis current control mode of the switching network wherein the current flowing through the inductor varies between a first current threshold and a second current threshold with a triangular waveform having rising and falling edges alternating with a switching frequency; and
controlling said switching frequency by adjusting one or more of the first and second current thresholds to vary a distance between the first current threshold and the second current threshold;
wherein the input signal applied across the first input node and the second input node comprises an AC signal having a period encompassing a plurality of alternations of rising and falling edges of said triangular waveform of the current through the inductor coupling the switching network and the first input node; and
activating said hysteresis current control mode of the switching network in the converter circuit over the whole period the AC input signal with the current flowing through the inductor having constant valley values over the entirety of said plurality of alternations of rising and falling edges of said triangular waveform of the current through the inductor.

11. A converter circuit, comprising:
a first input node and a second input node configured to receive an input signal applied therebetween;
a first output node and a second output node configured to provide a converted output signal therebetween;
a switching network arranged intermediate the first and second input nodes and the first and second output nodes, the switching network coupled to the first input node via an inductor having a current flowing therethrough;
control circuitry coupled to the switching network in the converter and configured to operate the switching network in a hysteresis switching current control mode wherein the current flowing through the inductor varies between a first current threshold and a second current threshold with a triangular waveform having rising and falling edges alternating with a switching frequency and said switching frequency is controlled by adjusting one or more of the first and second current thresholds to vary a distance between the first current threshold and the second current threshold;
wherein the input signal applied across the first input node and the second input node comprises an AC signal having a half period encompassing a plurality of alternations of rising and falling edges of said triangular waveform; and
wherein the control circuitry adjusts the one or more of the first and second current thresholds is applied over an entirety of the half period of the AC signal.

12. The converter circuit of claim 11, further comprising a current sensor intermediate the first input node and said inductor, the current sensor coupled to the control circuitry and configured to provide to the control circuitry a signal indicative of the intensity of the current flowing through the inductor.

13. The converter circuit of claim 11, wherein said switching frequency is an inverse function of the distance between the first current threshold and the second current threshold, and wherein said control circuitry controls a reduction in said switching frequency by increasing the distance between the first current threshold and the second current threshold.

14. The converter circuit of claim 11, wherein the control circuitry adjusts the second current threshold and maintains the first current threshold.

15. The converter circuit of claim 11, wherein the first current threshold and the second current threshold have opposite signs, and wherein the current flowing through the inductor during said hysteresis current control mode flows alternately in a first flow direction from the first input node to the switching network and in a second flow direction from the switching network to the first input node.

16. The converter circuit of claim 11, wherein adjusting is applied over all of an input signal amplitude range of the AC signal during the half period.

17. A converter circuit, comprising:
a first input node and a second input node configured to receive an input signal applied therebetween;
a first output node and a second output node configured to provide a converted output signal therebetween;
a switching network arranged intermediate the first and second input nodes and the first and second output nodes, the switching network coupled to the first input node via an inductor having a current flowing therethrough;

control circuitry coupled to the switching network in the converter and configured to operate the switching network in a hysteresis switching current control mode wherein the current flowing through the inductor varies between a first current threshold and a second current threshold with a triangular waveform having rising and falling edges alternating with a switching frequency and said switching frequency is controlled by adjusting one or more of the first and second current thresholds to vary a distance between the first current threshold and the second current threshold;

wherein the input signal applied across the first input node and the second input node comprises an AC signal having a period encompassing a plurality of alternations of rising and falling edges of said triangular waveform of the current through the inductor coupling the switching network and the first input node; and wherein the control circuitry activates said hysteresis current control mode of the switching network in the converter circuit over the whole period of the AC input signal with the current flowing through the inductor having constant valley values over a portion of said plurality of alternations of rising and falling edges of said triangular waveform of the current through the inductor.

18. A converter circuit, comprising:

a first input node and a second input node configured to receive an input signal applied therebetween;

a first output node and a second output node configured to provide a converted output signal therebetween;

a switching network arranged intermediate the first and second input nodes and the first and second output nodes, the switching network coupled to the first input node via an inductor having a current flowing therethrough;

control circuitry coupled to the switching network in the converter and configured to operate the switching network in a hysteresis switching current control mode wherein the current flowing through the inductor varies between a first current threshold and a second current threshold with a triangular waveform having rising and falling edges alternating with a switching frequency and said switching frequency is controlled by adjusting one or more of the first and second current thresholds to vary a distance between the first current threshold and the second current threshold;

wherein the input signal applied across the first input node and the second input node comprises an AC signal having a period encompassing a plurality of alternations of rising and falling edges of said triangular waveform of the current through the inductor coupling the switching network and the first input node; and wherein the control circuit activates said hysteresis current control mode of the switching network in the converter circuit over the whole period the AC input signal with the current flowing through the inductor having constant valley values over the entirety of said plurality of alternations of rising and falling edges of said triangular waveform of the current through the inductor.

19. A device, comprising:
the converter circuit according to claim 11; and an electrical load coupled intermediate said first output node and said second output node to be supplied said converted output signal from said first output node and said second output node.

20. The method of claim 9, wherein said switching frequency is an inverse function of the distance between the first current threshold and the second current threshold, and wherein controlling said switching frequency comprises reducing said switching frequency by increasing the distance between the first current threshold and the second current threshold.

21. The method of claim 9, wherein the first current threshold and the second current threshold have opposite signs, and wherein the current flowing through the inductor during said hysteresis current control mode flows alternately in a first flow direction from the first input node to the switching network and in a second flow direction from the switching network to the first input node.

22. The method of claim 9, wherein adjusting is applied over all of an input signal amplitude range of the AC signal during the half period.

23. The method of claim 10, wherein said switching frequency is an inverse function of the distance between the first current threshold and the second current threshold, and wherein controlling said switching frequency comprises reducing said switching frequency by increasing the distance between the first current threshold and the second current threshold.

24. The method of claim 10, wherein the first current threshold and the second current threshold have opposite signs, and wherein the current flowing through the inductor during said hysteresis current control mode flows alternately in a first flow direction from the first input node to the switching network and in a second flow direction from the switching network to the first input node.

25. The method of claim 10, wherein adjusting is applied over all of an input signal amplitude range of the AC signal during the half period.

26. The converter circuit of claim 17, wherein the first current threshold and the second current threshold have opposite signs, and wherein the current flowing through the inductor during said hysteresis current control mode flows alternately in a first flow direction from the first input node to the switching network and in a second flow direction from the switching network to the first input node.

27. A device, comprising:
the converter circuit according to claim 17; and
an electrical load coupled intermediate said first output node and said second output node to be supplied said converted output signal from said first output node and said second output node.

28. The converter circuit of claim 18, wherein the first current threshold and the second current threshold have opposite signs, and wherein the current flowing through the inductor during said hysteresis current control mode flows alternately in a first flow direction from the first input node to the switching network and in a second flow direction from the switching network to the first input node.

29. A device, comprising:
the converter circuit according to claim 18; and
an electrical load coupled intermediate said first output node and said second output node to be supplied said converted output signal from said first output node and said second output node.

* * * * *